INVENTOR.
FILIBERTO A. BONAVENTURA &
DONALD E. PLYMPTON
BY
*Wm. H. Dean*
AGENT

Patented Sept. 14, 1954

2,688,923

UNITED STATES PATENT OFFICE 2,688,923

SOLAR ENERGY PUMP

Filiberto A. Bonaventura, La Mesa, and Donald E. Plympton, San Diego, Calif.

Application November 5, 1951, Serial No. 254,931

9 Claims. (Cl. 103—1)

Our invention relates to a solar energy pump, more particularly for water well pumping and the objects of our invention are:

First, to provide a pump of this class which is completely automatic for use in pumping water from wells by utilization of the sun's rays.

Second, to provide a solar energy pump of this class which is thermally efficient.

Third, to provide a solar energy pump of this class which requires very little maintenance attention.

Fourth, to provide a solar energy pump of this class having a novel means for alternately concentrating the sun's rays from a condenser onto a plurality of boilers.

Fifth, to provide a solar energy pump of this class having a plurality of boilers adapted to be alternately positioned in the heat concentration area of a condenser by novel fluid transfer means communicating with the interior of said boilers having metering valves therein which control the flow of liquid from one of the boilers to the other alternately causing gravitation of said boilers into said heat concentration area whereby pressure and vacuum is alternately created in said boilers.

Sixth, to provide a solar energy pump of this class employing a novel arrangement of expansion chambers and check valves for lifting water from deep holes.

Seventh, to provide a solar energy pump of this class which should pump a considerable volume of water at a very low cost.

Eighth, to provide a solar energy pump of this class which will operate where considerable changes in temperature occur, even without direct exposure to sunlight very simple to install.

Ninth, to provide a solar energy pump of this class which is very simple and economical of construction, efficient in operation and which will not readily deteriorate or get out of order.

With these and other objects in view as will appear hereinafter our invention consists of certain novel features of construction, combination and arrangement of parts and portions and a certain modification as will be hereinafter described in detail and particularly set forth in the appended claims, reference being had to the accompanying drawings and to the characters of reference thereon forming a part of this application in which:

Similar characters of reference refer to similar parts and portions throughout the several views of the drawings.

Figure 1:
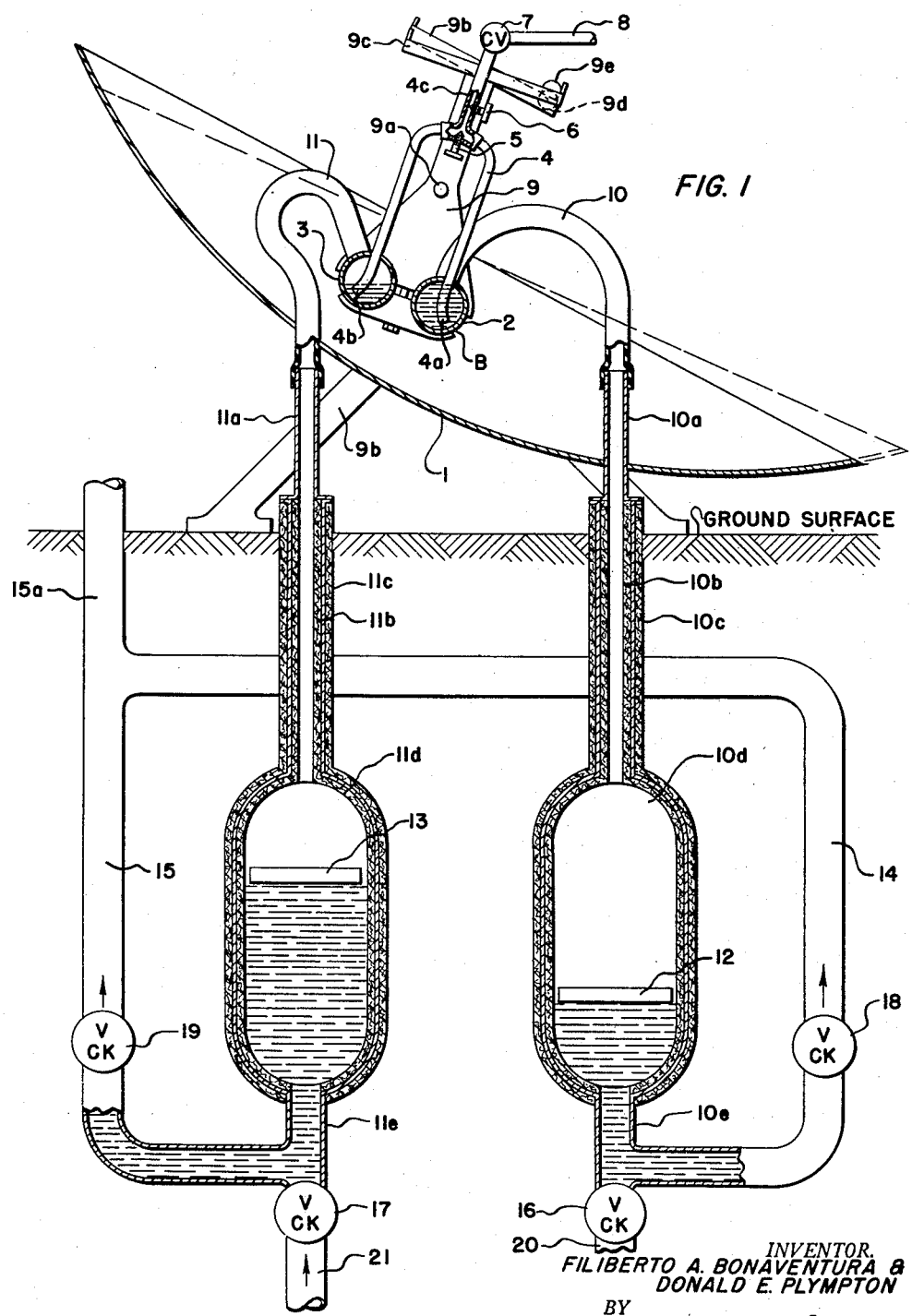
Figure 1 is a vertical sectional view of our solar energy pump showing portions thereof in elevation and illustrating by dash lines varying various positions of parts and portions thereof.

The reflector 1, boilers 2 and 3, fluid transfer conductor 4, metering valve 5, water inlet valve 6, check valve 7, water inlet tube 8, boiler supporting bracket 9, steam conductors 10 and 11, floats 12 and 13, water delivery tubes 14 and 15, check valves 16, 17, 18 and 19, and the water supply tubes 20 and 21 constitute the principal parts and portions of our solar energy pump.

Referring to Fig. 1 of the drawings, it will be seen that the reflector 1 is adapted to concentrate the sun's rays on the boiler 2 in the position B and the boilers 2 and 3 are mounted in spaced relationship to each other on the bracket 9 which is pivoted on the pin 9a to the upper end of the supporting frame 9b. The fluid transfer conductor 4 at its opposite ends 4a and 4b communicates with the interior portions of the boiler 2 and 3 respectively and at the intermediate portion of said fluid transfer conductor 4 is the metering valve 5 which is adapted to restrict the flow of fluids through the fluid transfer conductor 4 from one of the boilers 2 or 3 to the other. Communicating with the fluid transfer conductor 4 is the tube 4c in which the water inlet valve 6 is positioned. The check valve 7 is arranged to prevent flow from the tube 4c into the water inlet tube 8. This check valve 7 freely permits water to flow from the water inlet tube 8 into the tube 4c and through the valve 6 which is adjusted to regulate the replacement of water in the boilers 2 and 3 which is carried off by steam through the steam conductors 10 and 11. The steam conductors 10 and 11 are flexible conductors communicating with the upper interior of the boilers 2 and 3 and these conductors 10 and 11 incorporate rigid sections 10a and 11a which are provided with internal and external insulation 10b and 10c, 11b and 11c respectively. These rigid conductor sections 10a and 11a are provided with enlarged chambers 10d and 11d in which the floats 12 and 13 are vertically reciprocally mounted and supported on the water in these chambers 10d and 11d. Communicating with the lower ends of the chambers 10d and 11d are reduced tubular conductors 10e and 11e which communicate with the check valves 16 and 17 respectively adapted to receive water from the water supply tubes 20 and 21. The check valves 20 and 21 permit flow into the tubes 10e and 11e respectively but prevent flow in the opposite direction into the water supply tubes 20 and 21. The water delivery tubes 14 and 15 communicate with the tubular portions 10e and 11e and the interior of the chambers 10d and 11d and these water delivery tubes 14 and 15 are provided with check valves 18 and 19 respectively which promote the flow of water into the common water delivery conductor 15a and prevent flow of water backwardly toward the valves 16 and 17.

It will be noted that the boiler supporting bracket 9 is provided with a pair of troughs 9b and 9c in which the balls 9d and 9e roll. These troughs 9b and 9c are disposed in angular relation to each other and to the bracket 9 whereby the balls 9d and 9e roll from one end to the other of these troughs for tripping the disposition of the bracket 9 over center of the pin 9a when the boilers 2 and 3 shift from one position to another relative to the concentration area of the rays condensed by the reflector 1.

The operation of our solar energy pump is substantially as follows:

When the sun's rays are reflected from the reflector 1 and condensed into a concentrated area upon the boiler 2 in the position B the heat concentrated on the boiler 2 causes expansion of the water therein creating pressure which forces the water upwardly through the fluid transfer tube 4 through the valve 5 and into the boiler 3. As the water in the boiler 2 is reduced in volume, steam is created which passes downwardly through the conductor 10 and into the enlarged chamber 10d wherein the float 12 acting as an insulator prevents condensation of the steam on the water in the chamber 10d and permits the steam to force the water downwardly and outwardly through the check valve 18 and water delivery tube 14. When the water has been completely exhausted from the boiler 2 and the steam delivered therefrom causes it to become proportional to the boiler 3 which has previously received the water from the boiler 2, the weight of the boiler 3 causes it to pivot downwardly into the position B and during this pivotal movement the ball 9e first rolls to the opposite end of the trough 9c, then the ball 9d subsequently rolls to the opposite end of the trough 9b from that position, as shown in Fig. 1 of the drawing, positively tripping the bracket 9 over the center of the pin 9a whereupon the boiler 3 is in the position B and heat from the sun's rays is concentrated thereon by the reflector 1 causing expansion of the water in the boiler 3, forcing the same through the transfer 4 to the boiler 2 and causing steam to be generated which passes through the tube 11 and into the chamber 11d forcing the insulator float 13 downwardly and projecting water through the valve 19 and upwardly through the water delivery tube 15. It will be noted that during the heating cycle of the boiler 3 the boiler 2 previously heated being disposed outwardly of the concentration area of the sun's rays from the reflector 1 cools which results in condensation of the steam in the boiler 2 which creates a partial vacuum. This partial vacuum is also created in the chamber 10d which draws water upwardly through the check valve 16 and into the chamber 10d below the float 12. When the boiler 2 has again been filled with liquid and the boiler 3 has been exhausted it is again pivoted into the position as shown in Figure 1 of the drawing by pivotal movement of the bracket 9 over the axis of the pin 9a and the positive shifting of the balls 9e and 9d in the trough 9b and 9c which prevents the bracket 9 from stopping and disposing the boilers 2 and 3 at a position wherein the concentration of the sun's rays is intermediate the boiler. It will be noted that when the boiler 3 after being heated is subsequently disposed in the position as shown in Figure 1 of the drawing, condensation occurs therein and in the chamber 11d causing a vacuum which draws water through the supply tube 21 and check valve 17 into the chamber 11d. It is therefore to be noted that the boilers 2 and 3 are alternately cycled by being heated and cooled causing pressure and vacuum therein which alternately operate the check valves 16 and 17 and 18 and 19 for delivering water upwardly through the delivery tube 15a. The cycle speed of the alternate heating and cooling of the boilers 2 and 3 is controlled by the restriction of the valve 5 which is adapted to contol flow through the fluid transfer conductor 4. This valve 5 may be adjusted according to the concentration of heat provided by the sun's rays for a particular locality or during a particular season. The valve 6 is arranged to provide for flow of water into the fluid transfer tube 4 and the boilers 2 and 3 to compensate for water which is carried off by steam which condenses in the conductors 10 and 11 as hereinbefore described. The check valve 7 prevents the flow outwardly through the tube 8 and permits flow of water inwardly through the tube 8 into the tube 4c intermediate the pressure cycle created during the operation of the boilers 2 and 3.

Figure 2:
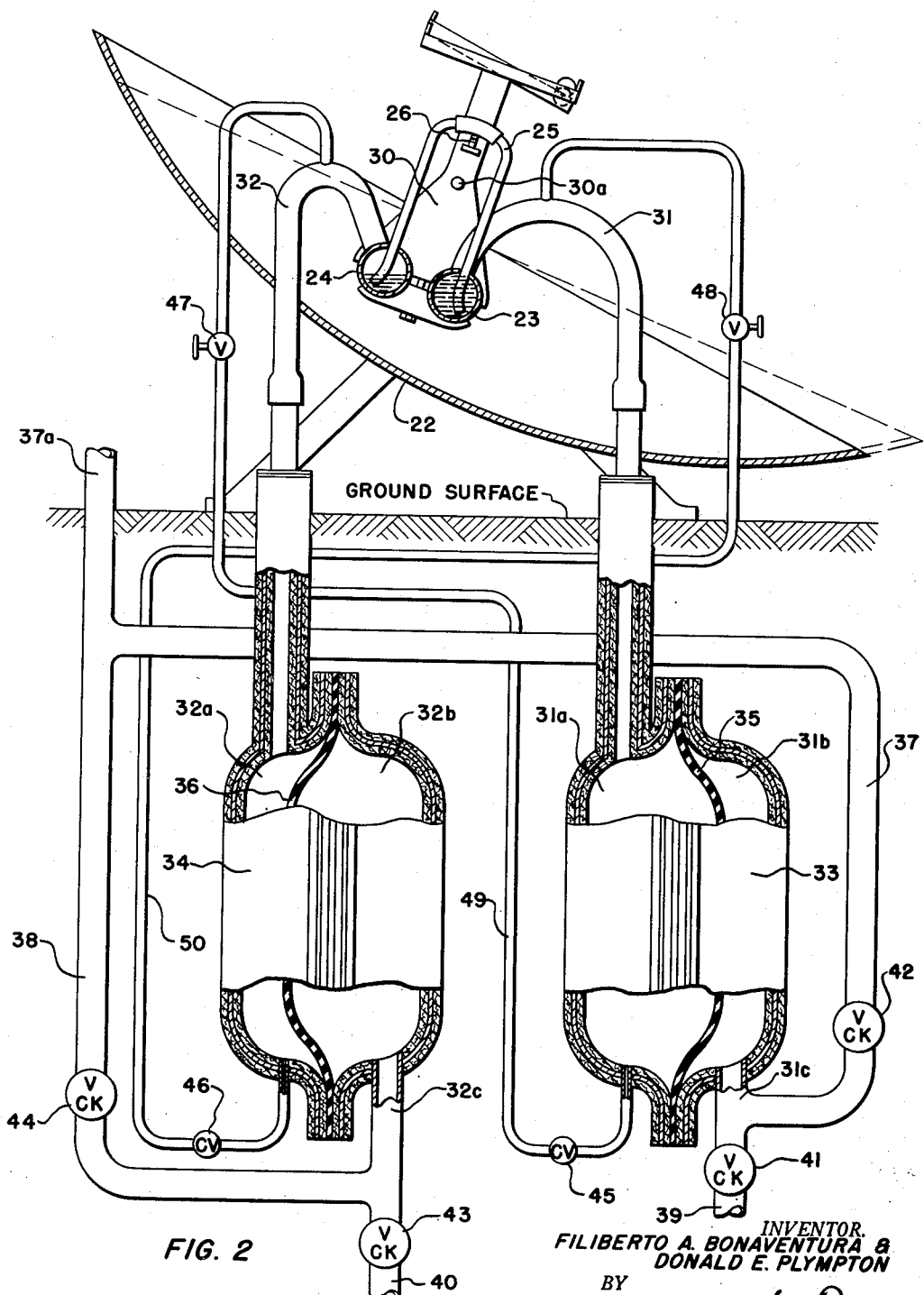
Figure 2 is a similar view of a modified form of our solar energy pump.

In the modification as shown in Figure 2 of the drawing the parts are designated as follows:

The reflector 22, boilers 23 and 24, fluid transfer conductor 25, metering valve 26, boiler supporting bracket 30, steam conductors 31 and 32, casings 33 and 34, diaphragms 35 and 36, water delivery tubes 37 and 38, water supply tubes 39 and 40, check valves 41, 42, 43, 44, 45, and 46, metering valves 47 and 48 and the condensate transfer tubes 49 and 50. The reflector 22 corresponds to the reflector 1 as hereinbefore described while the boilers 23 and 24 are similar to the boilers 2 and 3 hereinbefore described. The bracket 30 is similar to the bracket 9 hereinbefore described, and is pivoted on a pin 30a. The fluid transfer tube 25 is similar in structure and operation to the hereinbefore described tube 4 while the metering valve 26 is similar to metering valve 5 hereinbefore described. The steam conductors 31 and 32 are provided with enlarged chamber portions 31a and 32a respectively, which oppose chamber portions 31b and 32b respectively. These chambers are insulated internally and externally and interposed between the chamber portions 31a and 32b is the diaphragm 35 which is a flexible resilient diaphragm. The diaphragm 36 is similar to the diaphragm 35 and is positioned intermediate the chamber portions 32a and 32b all as shown best in Figure 2 of the drawing. Communicating with the chamber portion 31b on the opposite side of the diaphragm 35 from the chamber portion 31a is the tubular conductor 31c which communicates with the check valves 41 and 42 which are similar in operation to the hereinbefore described check valves 16 and 18 respectively. The water delivery tube 37 communicates with the check valve 42 and with the main water delivery tube 37a. The tube 32c communicates with the chamber 32b on the opposite side of the diaphragm from the chamber 32a and also communicates with the water delivery tube 38. The structure and operation of the check valves 43 and 44 corresponds to the structure and operation of the valves 17 and 19 hereinbefore described in connection with Figure 1 of the drawing. Communicating with the chambers 31a and 32a are the condensate transfer tubes 49 and 50 respectively and it will be noted that these tubes communicate with the lowermost portion of the chambers 31a and 32a. The check valves 45 and 46 promote flow from the chambers 31a and 32a to the uppermost portions of the tubes 32 and 31 respectively. Positioned in these tubes 49 and 50 are the metering valves 47 and 48 adapted to restrict flow through these tubes 49 and 50 to prevent the excessive loss of pressure in chambers 31a and 32a.

The operation of the modified structure shown in Figure 2 of the drawing is substantially as follows:

The boilers 23 and 24, fluid transfer tube 25, metering valve 26, and bracket 39 all operate similar to the structure hereinbefore described in connection with the Figure 1 of the drawing. During operation of the modified structure shown in Figure 2 of the drawings it is contemplated that liquid of a low boiling temperature may be employed in the boilers 23 and 24 for use in areas where cloudy weather is prevalent or areas where sunshine is not very direct. Employing a liquid of a low boiling temperature in the boilers 23 and 24 dictates the separation thereof from the water in the tubes 31c and 32c which communicates with the chambers 31b and 32b at opposite sides of the diaphragms 35 and 36 from the chambers 31a and 32a respectively. Therefore subsequent heating and expansion and cooling and contraction in the chambers 31a and 32a simply deflects the diaphragms 35 and 36 back and forth alternately causing pressure on liquid in the chambers 31b and 32b and creating a vacuum therein for drawing water into the chambers 31b and 32b and emptying the same outwardly through the check valves 42 and 44 in order to provide a flow of water to the water delivery tubes 37 and 38.

Thus the modified structure as shown in Figure 2 of the drawings operates in a similar manner to that shown in Figure 1 of the drawings except that it provides for the use of liquids in the boilers having a lower boiling temperature. In the event the liquid having a lower boiling temperature condenses in the chambers 31a and 32a it is transferred backwardly into the tubes 32 and 31 respectively by means of the tubes 49 and 50. Check valves 45 and 46 prevent the flow of the liquid backwardly into the chambers 31a and 32a while the metering valves 47 and 48 in connection with tubes 49 and 50 reduce the pressure loss from the chambers 31a and 32a when under pressure. It will be noted that when the chamber 31a is under pressure, the chamber 32a is undergoing vacuum so that any condensate in the lower portion of the chamber 31a is under pressure and forced into the tube 49 and is received by a negative pressure in the conductor 32 which is in communication with the chamber 32a. The same conditions occur when condensate is relieved from the chamber 32a by the tube 50.

It will be here noted that in the construction shown in Figure 1 and in the construction shown in Figure 2 the pressure and vacuum cycles in the chambers 10d, 11d, and 31a and 32a respectively, provides for the creation of such vacuum and pressure cycles in adjacent relationship to the water supply at the bottom of a well. Therefore, the conductors in connection with the boilers of both structures may extend downwardly into a well at considerable depth and the check valves at the water supply tubes must be within a distance equal to the liquid head corresponding to the atmospheric pressure prevalent at the particular installation. The insulated steam conductors prevent loss of pressure during the steam pressure cycle and thereby maintains efficiency of our solar energy pump.

Though we have shown and described a particular construction, combination and arrangement of parts and portions we do not wish to be limited to a particular construction, combination and arrangement or to the modification shown but desire to include in the scope of our invention the construction, combination and arrangement substantially as set forth in the appended claims.

Having thus described our invention what we claim as new and desire to secure by Letters Patent is:

1. In a solar energy pump, a condenser, a boiler adapted to receive concentrated sun's rays from said condenser, a vapor delivery tube extending from said boiler downwardly to reach a cool area, an enlarged chamber communicating with said vapor delivery tube, a fluid supply tube communicating with said chamber, a check valve in said fluid supply tube adapted to prevent flow from said chamber to said fluid supply tube, a fluid delivery tube above said check valve and communicating with said chamber and having a second check valve therein adapted to prevent flow from said fluid delivery tube downwardly, said chamber having a diaphragm dividing the chamber into two parts, said steam delivery tube communicating with one of said parts, a liquid of a low boiling temperature in said boiler.

2. In a solar energy pump, a pair of boilers, a condenser adapted to concentrate the sun's rays on an area equal to the size of one of said boilers, a bracket supporting said boiler and pivotally mounted relative to said condenser, a fluid transfer tube having its opposite ends positioned in said boiler, a metering valve in said tube adapted to restrict flow between said boilers in said fluid transfer tube, steam outlet tubes each connected to the upper portion of one of said boilers, and a pair of pump cylinders having pistons operatively mounted therein and connected individually with said steam outlet pipes.

3. In a solar energy pump, a pair of boilers, a condenser adapted to concentrate the sun's rays on an area equal to the size of one of said boilers, a bracket supporting said boiler and pivotally mounted relative to said condenser, a fluid transfer tube having its opposite ends positioned in said boiler, a metering valve in said tube adapted to restrict flow between said boilers in said fluid transfer tube, steam outlet tubes each connected to the upper portion of one of said boilers, a water inlet valve communicating with said fluid transfer tube and a check valve communicating with said water inlet valve, and a pair of pump cylinders having pistons operatively mounted therein and connected individually with said steam outlet tubes.

4. In a solar energy pump, a pair of boilers, a condenser adapted to concentrate the sun's rays on an area equal to the size of one of said boilers, a bracket supporting said boiler and pivotally mounted relative to said condenser, a fluid transfer tube having its opposite ends positioned in said boiler, a metering valve in said tube adapted to restrict flow between said boilers in said fluid transfer tube, steam outlet tubes each connected to the upper portion of one of said boilers, a water inlet valve communicating with said fluid transfer tube and a check valve communicating with said water inlet valve, a chamber communicating with each of said steam outlet tubes adapted to be positioned below the ground adjacent a source of water, supply tubes communicating with said chambers, check valves in said supply tubes adapted to prevent flow downwardly and water delivery tubes communicating with said chambers above said check valves and having check valves therein adapted to prevent flow downwardly.

5. In a solar energy pump, a pair of boilers, a condenser adapted to concentrate the sun's rays on an area equal to the size of one of said boilers, a bracket supporting said boiler and pivotally mounted relative to said condenser, a fluid transfer tube having its opposite ends positioned in said boiler, a metering valve in said tube adapted to restrict flow between said boilers in said fluid transfer tube, a steam outlet tube connected to the upper portion of said boiler, a water inlet valve communicating with said fluid transfer tube and a check valve communicating with said water inlet valve, a chamber communicating with each of said steam outlet tubes adapted to be positioned below the ground adjacent a source of water, supply tubes communicating with said chamber check valves therein adapted to prevent flow downwardly, and water delivery tubes communicating with said chambers above said check valves and having check valves therein adapted to prevent flow downwardly and insulated floats in said chambers.

6. In a solar energy pump, a pair of boilers, a condenser adapted to concentrate the sun's rays on an area equal to the size of one of said boilers, a bracket supporting said boiler and pivotally mounted relative to said condenser, a fluid transfer tube having its opposite ends positioned in said boiler, a metering valve in said tube adapted to restrict flow between said boilers in said fluid transfer tube, a steam outlet tube connected to the upper portion of said boiler, a water inlet valve communicating with said fluid transfer tube and a check valve communicating with said water inlet valve, a chamber communicating with each of said steam outlet tubes adapted to be positioned below the ground adjacent a source of water, supply tubes communicating with said chamber check valves therein adapted to prevent flow downwardly and water delivery tubes communicating with said chambers above said check valves and having check valves therein adapted to prevent flow downwardly, insulated floats in said chambers, and said chambers having resilient diaphragms at the middle portion thereof permitting use of liquids of a low boiling temperature in said boiler whereby the liquid in the boilers is separated from the water in the opposite side of the diaphragm.

7. In a solar energy pump, a pair of boilers, a condenser adapted to concentrate the sun's rays on an area equal to the size of one of said boilers, a bracket supporting said boiler and pivotally mounted relative to said condenser, a fluid transfer tube having its opposite ends positioned in said boiler, a metering valve in said tube adapted to restrict flow between said boilers in said fluid transfer tube, a steam outlet tube connected to the upper portion of said boiler, a water inlet valve communicating with said fluid transfer tube and a check valve communicating with said water inlet valve, a chamber communicating with each of said steam outlet tubes adapted to be positioned below the ground adjacent a source of water, supply tubes communicating with said chamber check valves therein adapted to prevent flow downwardly and water delivery tubes communicating with said chambers above said check valves and having check valves therein adapted to prevent flow downwardly, insulated floats in said chambers, said chambers having resilient diaphragms at the middle portion thereof permitting use of liquids of a low boiling temperature in said boiler whereby the liquid in the boilers is separated from the water in the opposite side of the diaphragm, condensate transfer tubes communicating with the lower portion of said chamber at the sides of said diaphragms communicating with said boilers, said condensate transfer tubes at their upper ends communicating with said steam conductor tubes opposed to the respective chambers, check valves in said condensate transfer tubes, and metering valves adapted to prevent pressure loss from said chamber in said condensate transfer tubes.

8. A pair of pivotally mounted boilers, a condenser adapted to concentrate the heat rays of the sun on one of said boilers, a fluid transfer tube at its opposite ends communicating with the interior of said boiler whereby fluid may be transferred from one boiler to the other during heating of one boiler whereby the fluid causes gravitation of the boiler into which it is dispensed which shifts its pivotal relationship with said condenser into the heat concentration area thereof, said fluid transfer tube having a metering valve therein that restricts flow from one of said boilers to the other, a fluid inlet valve communicating with said liquid transfer tube, steam tubes communicating with tops of said boilers and pump cylinders operatively connected with said steam tubes.

9. A pair of pivotally mounted boilers, a condenser adapted to concentrate the heat rays of the sun on one of said boilers, a fluid transfer tube at its opposite ends communicating with the interior of said boilers whereby fluid may be transferred from one boiler to the other during heating of one boiler whereby the fluid causes gravitation of the boiler into which it is dispensed which shifts its pivotal relationship with said condenser into the heat concentration area thereof, said fluid transfer tube having a metering valve therein that restricts flow from one of said boilers to the other, a fluid inlet valve communicating with said liquid transfer tube and a steam tube communicating with the tops of said boilers, a bracket forming a pivotal mounting for said boilers having a pair of angular troughs at the upper end thereof, shiftable means in said troughs for providing a shifting center of gravity in order to prevent the disposition of said boilers at a stall point wherein the concentration of the sun's rays is between the same.

References Cited in the file of this patent

UNITED STATES PATENTS

| Number | Name | Date |
| --- | --- | --- |
| 2,461,032 | Bush | Feb. 8, 1949 |